United States Patent [19]

Browning et al.

[11] 4,235,307

[45] Nov. 25, 1980

[54] REMOTE TRANSMISSION LUBRICATION SYSTEM

[75] Inventors: Edgar P. Browning, Cedar Falls; Terry L. Sturtz, Waterloo, both of Iowa

[73] Assignee: Deere & Company, Moline, Ill.

[21] Appl. No.: 955,497

[22] Filed: Oct. 27, 1978

[51] Int. Cl.³ .......................... F01M 1/08; F16H 1/44
[52] U.S. Cl. ..................................... 184/6.12; 74/467; 184/6.23;
[58] Field of Search .................. 74/467, 665 O, 665 T; 184/6.12, 6, 6.23

[56] References Cited

U.S. PATENT DOCUMENTS

| | | | |
|---|---|---|---|
| 1,858,533 | 5/1932 | White | 184/6.12 |
| 2,775,308 | 12/1956 | Senkowski et al. | 184/6.12 X |
| 2,971,595 | 2/1961 | Fabere et al. | 74/665 T X |
| 3,383,937 | 5/1968 | Toenne et al. | 74/467 |
| 3,738,452 | 6/1973 | Havsinger | 184/6.12 |

*Primary Examiner*—David H. Brown

[57] ABSTRACT

A tractor transmission is provided with a clutch housing containing an oil reservoir vented to the main transmission which is vented to atmosphere. A transfer pump is disposed in the clutch housing to pump an oil-air mixture from the reservoir to the main transmission housing. A portion of the pumped oil-air mixture is diverted through a line of a predetermined size to lubricate the front differential. When the oil reaches the front differential, it is diverted to the left and right final drive gear spaces separated by left and right walls from the differential gears. The oil in the final drive spaces increases in height until it passes through either the bearings supporting the differential housing or through the center of the differential pinion gears to the differential gear spaced. Holes in the left and right walls provide maximum levels of oil in the final drive spaces. When the oil spills over into the differential gear space, it lubricates the differential gears and then passes into a baffle and an overflow line which is located below the center line of the differential. The baffles separate the oil from the air and the pressure of the air in the sealed differential forces the oil through the overflow line back to the reservoir in the clutch housing.

8 Claims, 3 Drawing Figures

REMOTE TRANSMISSION LUBRICATION SYSTEM

BACKGROUND OF THE INVENTION

The present invention relates generally to tractor transmission lubrication and more particularly to lubricating and cooling the front differential in a tractor transmission.

In the past, the lubrication system for the front differential has been totally independent of the remainder of the transmission. The front differential was vented to atmosphere and provided with its own special lubricant with a common oil level in the differential and final drive spaces.

A large number of problems were recognized and accepted with this self-contained front differential lubrication system.

One of the major problems was that a high oil level had to be maintained in the final drive gears which accordingly means that the differential gears, which can operate with a low oil level, would have to churn through the high oil level and incur extremely high power losses.

Another major problem was that the oil turbulence in the front differential would naturally result in extensive heat buildup.

Another problem was that the oil turbulence causes a generally higher temperature operation of the front differential than in any other major component thus requiring a special oil to be used in the front differential. This oil is different from the oil used throughout the remainder of the tractor transmission and hydraulic system and must frequently be checked to assure that the proper oil level is maintained.

A consequence of the heavier weight oil and the single oil level lubrication was that oil would be centrifuged out of the internal differential gear parts at high speeds resulting in poor lubrication.

An additional problem was presented by the vent which can plug with dirt and cause a high pressure build-up of air in the front differential.

An additional problem which is incurred with front differentials having hydraulic differential lock is that the oil in the hydraulic system would be a different viscosity from that in the front differential and thus elaborate seals were required to prevent mixing of the two oils.

SUMMARY OF THE INVENTION

The present invention provides a single lubrication system throughout the entire transmission including the front differential. An oil-air mixture is drawn from the reservoir in the clutch housing and a portion of this mixture is pumped to the front differential and into the final drive spaces. The oil first accumulates in the final drive spaces and then successively passes through the differential gears or overflows through an opening between the final drive and differential gear spaces into the differential gear space. An overflow return line behind an oil and air separating baffle allows the air pressure from the transfer pump to build up in the sealed front differential to force the oil above the overflow return line to enter the overflow return line and return to the reservoir in the clutch housing.

Through this system, it is possible to maintain a low oil level in the differential gear space so there is a substantially lower power loss due to oil churning.

With the low oil level and resulting low turbulence losses, there is less heat build-up and further with the constant circulation of cooler oil from the clutch housing reservoir (which has an oil cooler attached thereto), cool running is assured.

Further, with the lower heat build-up, transmission oil may be used in the front differential as well as the rest of the tractor transmission and hydraulic system.

By feeding the oil from the final drive spaces through the center of the differential gears into the differential gear space, good lubrication of the differential gears will be assured at all speeds.

Also since the front differential no longer is a self-contained system, it no longer needs to be checked periodically to assure that the oil is at a proper level.

For front differentials equipped with front differential lock, special seals are no longer required to separate two viscosity oils since the same oil can be used for a hydraulic operating fluid as well as lubricant.

By elimination of the venting in the front differential, the vent plugging problems are eliminated.

The above and additional advantages of the present invention will become apparent to those skilled in the art by a reading of the following detailed description when taken in conjunction with the accompany drawings.

DESCRIPTION OF THE PREFERRED EMBODIMENT

Figure 1:
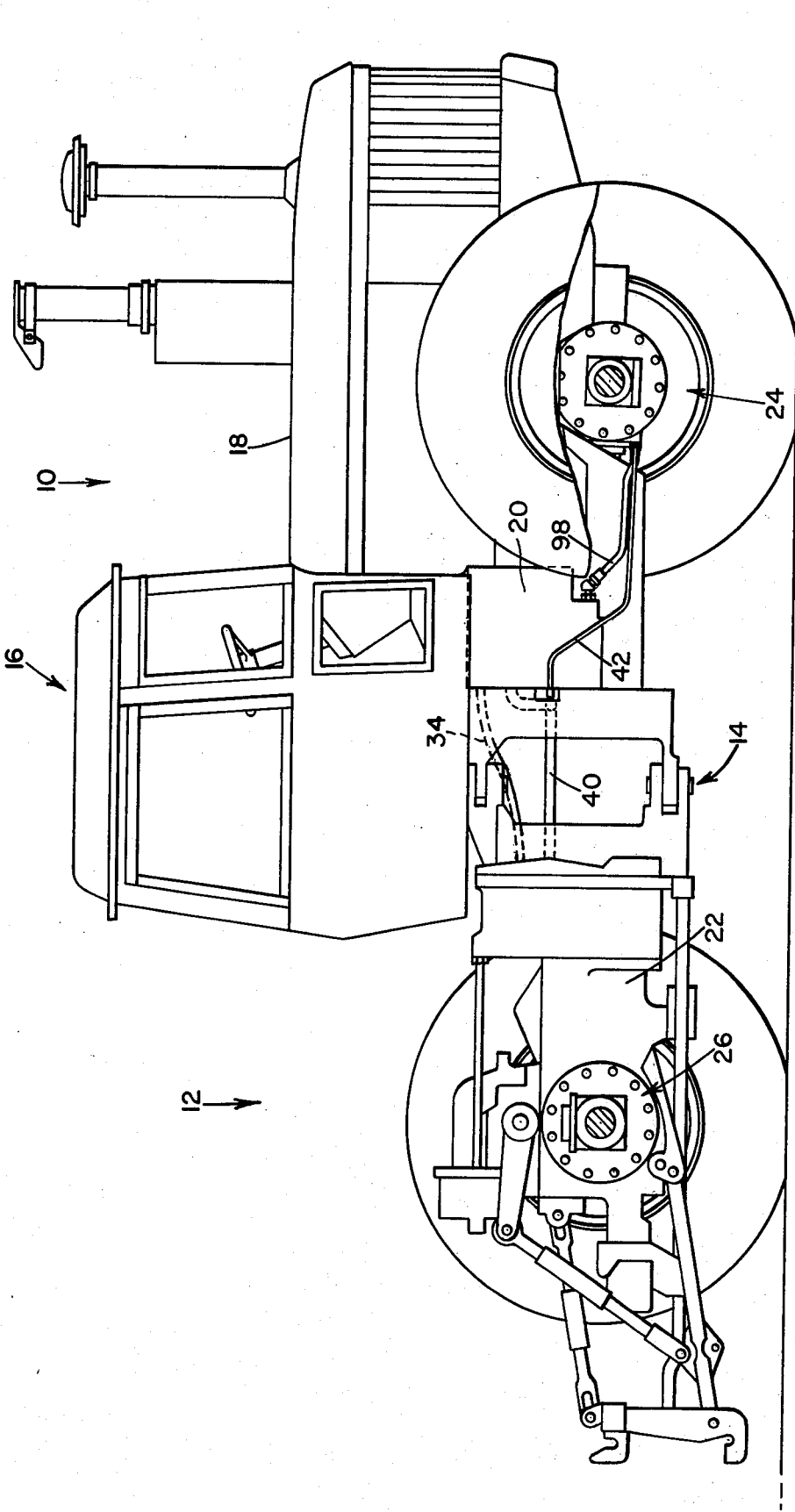
FIG. 1 is a side elevation partially in section of an articulated four-wheel drive tractor incorporating the present invention.

Referring now to FIG. 1, therein is shown an articulated four-wheel drive agricultural tractor having a front section 10 and a rear section 12 joined by a hinge section 14. The front section 10 carries a cab 16 and an engine 18.

The engine 18 provides motive power through a clutch housing 20 to a main transmission 22 and thence to front and rear differentials 24 and 26, respectively.

Figure 2:
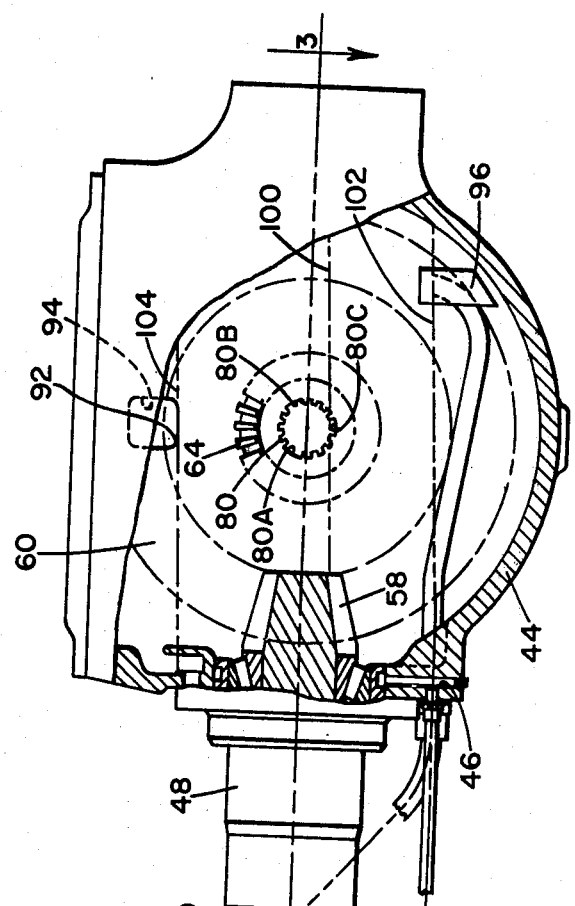
FIG. 2 is a close-up, partially in section, of the present invention.

Referring now to FIG. 2 showing the remote transmission lubrication system, therein is shown the clutch housing 20 which contains a fluid reservoir 28 which is filled with a lubricant transmission oil which is generally of 15W–30 weight. The reservoir 28 has an oil level 30 which is such that part of an intake filter 32 is exposed to air above the oil level 30. The air in the clutch housing 20 is connected to the main transmission by the clutch housing vent line 34 which is vented to atmosphere.

The intake filter 32 is connected by an intake line 36 to a fluid transfer pump 38 which is sized so as to generally draw an oil-air mixture through the intake filter 32 of approximately 60% oil and 40% air. The transfer pump 38 supplies the oil-air mixture through an outlet line 40 to the main transmission 22.

A front differential lubrication line 42 having a predetermined cross-sectional area is connected to the outlet line 40 to allow a predetermined portion of the oil-air mixture to be pumped to the front differential 24. The front differential 24 includes a front differential housing 44 containing a lubrication passage 46 connected to an annular groove in a pinion quill 48 which supports the drive shaft 50 from the main transmission 22.

Figure 3:
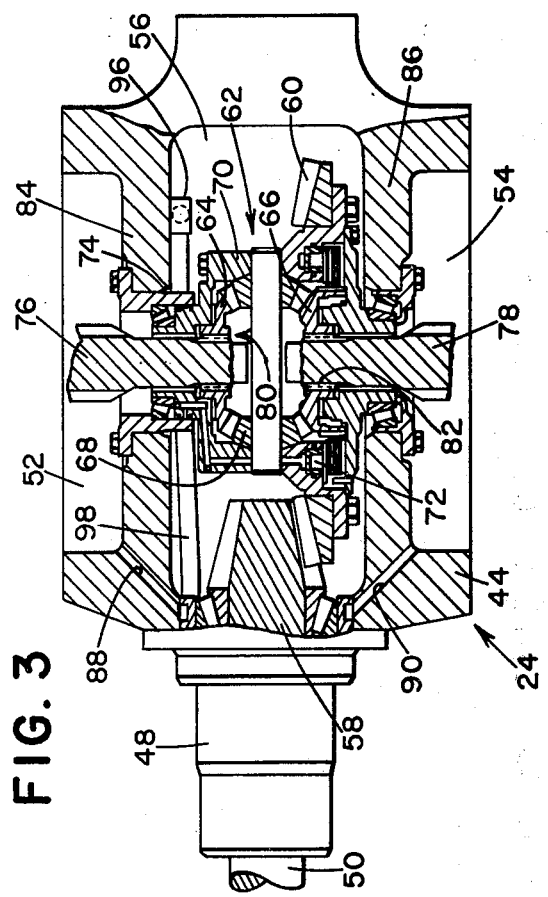
FIG. 3 is a top view of a portion of the front differential incorporating a portion of the present invention.

Referring now to FIG. 3, therein is shown the front differential housing 44 having left and right final drive spaces 52 and 54, respectively, disposed on either side of a differential gear space 56. Positioned within the differential gear space 56 is a pinion gear 58 driven by the drive shaft 50 which engages a spiral bevel gear 60 which is part of a differential gear set 62. The differential gear set 62 contains left and right differential gears 64 and 66 connected by a plurality of pinion gears designated by the numeral 68 which are carried by a carrier 70.

In the preferred embodiment, the carrier 70 contains a conventional hydraulic differential lock system 72 which requires rotary seals 74 to allow the transmission of hydraulic pressure from the differential lock control system (not shown) to lock the left and right differential gears 64 and 66 together to prevent relative rotation therebetween.

Left and right final drive sun pinion shafts 76 and 78 are disposed through the left and right differential gears 64 and 66, respectively, and are connected thereto by splines 80 and 82, respectively. To allow the passage of lubricant from the left and right final drive spaces 52 and 54, through left and right walls 84 and 86 to the differential gear set 62, the left and right differential gears 64 and 66 have three equally spaced splined teeth removed. These toothless areas are designated 80A, 80B, and 80C on left differential gear 64, see FIG. 2.

The left and right final drive spaces 52 and 54 are supplied by oil from left and right lubrication passages 88 and 90 which are connected to the annular groove on the pinion quill 48 to obtain oil from the front differential lubrication line 42.

To assure the passage of oil from the left and right final drive spaces 52 and 54 when the oil is too viscous to quickly flow past the splines 80 and 82, respectively, left and right openings 92 and 94 are respectively provided in the left and right walls 84 and 86.

Secured to the left wall 84 is a baffle 96 in which an overflow return line 98 is disposed. The overflow return line 98 extends from the baffle 96 through the front differential housing 44 to the clutch housing 20 where it is connected to return oil to the reservoir 28.

Since lubrication is supplied directly only to the left and right final drive spaces 52 and 54, the oil level therein will generally be between that level indicated by the numeral 100 which is at the lowermost position of the splines 80, 82 and the level indicated by the numeral 104 which is where oil will overflow through the openings 92 and 94. In the differential gear space 56, because of the overflow return line 98, the oil level will be generally at that level designated by the numeral 102.

Initially, before start-up, the oil level in the clutch housing 20 is above that designated by the numeral 30, the oil level in the left and right final drive spaces 52 and 54 is at the oil level designated by the numeral 100, and the oil level in the differential gear space 56 is at a level between that level designated by the numerals 102 and 100.

Upon start-up, the oil level in the clutch housing 20 will be immediately lowered to the oil level 30 by the action of the transfer pump 38. Once the oil level is lowered to the oil level 30, air will be drawn in through the vent 34 and the transfer pump 38 will draw the oil-air mixture of approximately 60% oil and 40% air through the intake filter 32. While the bulk of the mixture will be supplied to the main transmission 22, a portion will be diverted through the front differential lubrication line 42 and a lubrication passage 46 through the pinion quill 48 to the left and right lubrication passages 88 and 90.

Oil passing through the right lubrication passage 90 will pass in to the right final drive space 54 and will pass through the various bearings as well as through the right differential gear 66 into the differential gear space 56.

Oil passing through the left lubrication passage 88 will pass into the left final drive space 52, but will not be able to pass through the bearing supporting the carrier 70 because of the seal 74 of the differential lock 72. Thus, while a portion of the oil will pass through the left differential gear 64 through the tooth spaces 80A, 80B, and 80C, the oil level will build towards the oil level designated by numeral 104. When the oil reaches the level 104, it will pour through the opening 92 into the differential gear space 56.

As soon as the oil-air mixture passes into the left and right final drive spaces 52 and 54, the air and oil begin to separate and the air pressure in the sealed front differential housing 44 begins to increase. Here the openings 92 and 94 act to equalize air pressure in the differential and final drive gear spaces 56, 52, and 54. As the air pressure increases, it forces the oil in the differential gear space 56 into the baffle 96 and causes it to overflow into the overflow return line 98 to return the oil to the reservoir 28 and cause the oil level in the differential gear space to drop to the oil level 102.

In operation, the oil-air mixture taken from the reservoir 28 by the transfer pump 38 is passed through the front differential lubrication line 42 to the left and right final drive spaces 52 and 54 to lubricate the gears therein. Since the oil level in the final drive spaces will be higher than the oil level 100, oil will pass along the center of the gear shafts 76 and 78 to lubricate the differential gear set 62 from the center such that centrifugal action cannot throw all the lubricant from the gears.

As the tractor speeds up, the oil in the differential gear space 56 will become more and more turbulent due to the speed of the spiral bevel gear 60. At this point, the effect of the baffle 96 will become more apparent as it provides a quiescent area for the oil to be separated from the air and the oil to pass into the overflow return line 98.

Since the oil to the clutch housing 20 is generally cooled by the normal vehicle cooling system (not shown) cool oil is constantly circulated to the front differential 24.

During operation, the entire remote transmission lubrication system becomes self-regulating in that additional air provided to the front differential 24 by the oil-air mixture tends to maintain the oil level 102 in the differential gear space 56 and a high oil level between the oil levels 100 and 104 in the left and right final drive spaces 52 and 54.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. In a vehicle having a transmission including a fluid reservoir portion vented to exterior air and a gear carrying distally located portion, a fluid lubrication system comprising: fluid transfer means connected to said reservoir portion of said transmission and having an inlet for drawing a fluid-air mixture from said reservoir portion of said transmission and an outlet for output of the fluid-air mixture; first passage means connected to said outlet of said transfer means and to said distally located portion of said transmission for the passage of the fluid-air mixture from said transfer means into said distally located portion of said transmission; means sealing said distally located portion of said transmission from the exterior air; separator means disposed in said distally located portion of said transmission for separating the fluid-air mixture into fluid and air; and overflow passage means disposed in said separator means and connected to said reservoir portion of said transmission for substantially limiting the fluid to a predetermined height and to cause the fluid above the predetermined height to overflow thereinto to be returned to said reservoir portion of said transmission under the pressure of the air accumulating in said distally located portion of said transmission.

2. The fluid lubrication system of claim 1 wherein said distally located portion of said transmission comprises first and second final drive gear containing spaces and a differential gear containing space separated by walls each having an aperature provided therein above the predetermined height, said first passage means being connected to said first and second final drive gear containing spaces, , and said overflow passage means being connected to and disposed in said differential gear containing space whereby the fluid level in said first and second final drive gear containing spaces will be higher than in said differential gear containing space.

3. The fluid lubrication system of claim 2 comprising a shaft extending through and carried by said apertures, first and second gears carried on said shaft and respectively disposed in said differential gear containing space, said first and second gears having means provided therein for passage of the fluid therethrough from said first and second final drive gear containing spaces to said differential gear containing space to lubricate said first and second gears.

4. The fluid lubrication system of claim 2 wherein each of said walls contains an opening therein above said apertures for limiting the fluid in said first and second gear spaces to a predetermined height above said first-mentioned predetermined height.

5. In a vehicle having a transmission including a clutch housing having a fluid reservoir provided therein with a vent to exterior air, a first differential housing spaced from said clutch housing, and a main transmission housing including a second differential housing spaced from said first differential housing and said clutch housing, a fluid lubrication system comprising: a transfer pump disposed in said clutch housing and having an inlet for drawing fluid-air mixture from said fluid reservoir and an outlet for output of the fluid-air mixture to said main transmission housing; first passage means having a predetermined size connected to said outlet of said transfer pump and said first differential housing for the passage of a predetermined portion of the fluid-air mixture from said transfer pump to be pumped into said first differential housing; means sealing said first differential housing from the exterior air and preventing the escape of air therefrom; baffle means connected to the differential housing for separating the fluid-air mixture into fluid and air whereby the air is disposed above the fluid; and overflow passage means disposed in said baffle and connecting said first differential housing to said clutch housing for substantially limiting the fluid to a predetermined height and to cause the fluid above the predetermined height to overflow thereinto to be returned to said fluid reservoir under the pressure of the air accumulating above the fluid in said first differential housing.

6. The fluid lubrication system of claim 5 wherein the first differential housing comprises a differential gear space disposed between first and second final drive gear containing spaces and respectively separated therefrom by first and second walls having respective first and second apertures provided therein above the predetermined height, said first passage means connected to at least two secondary passage means provided in said first differential housing and respectively connected to said first and second final drive gear containing spaces, and said overflow passage means being connected to and disposed in said differential gear containing space whereby the fluid-air can pass from said first and second final drive gear containing spaces through said first and second apertures to a lower level in said differential gear containing space.

7. The lubrication system of claim 6 wherein said differential gear housing includes a differential gear set, said differential gear set comprising first and second pinion gears respectively disposed on first and second shafts extending through and respectively carried by said first and second apertures, said first and second pinion gears having means provided therein for the passage of fluid therethrough from said first and second final drive gear containing spaces into said differential gear containing space.

8. The fluid lubrication system of claim 7 wherein said first and second walls respectively include first and second openings provided therein above said apertures for substantially limiting the amount of fluid in said first and second final drive gear containing spaces to a predetermined height above said first-mentioned predetermined height.

* * * * *